May 22, 1928. 1,671,052
W. E. STERK ET AL
CUTTING TOOL FOR EARTH, ROCK, AND STONE
Filed July 6, 1925
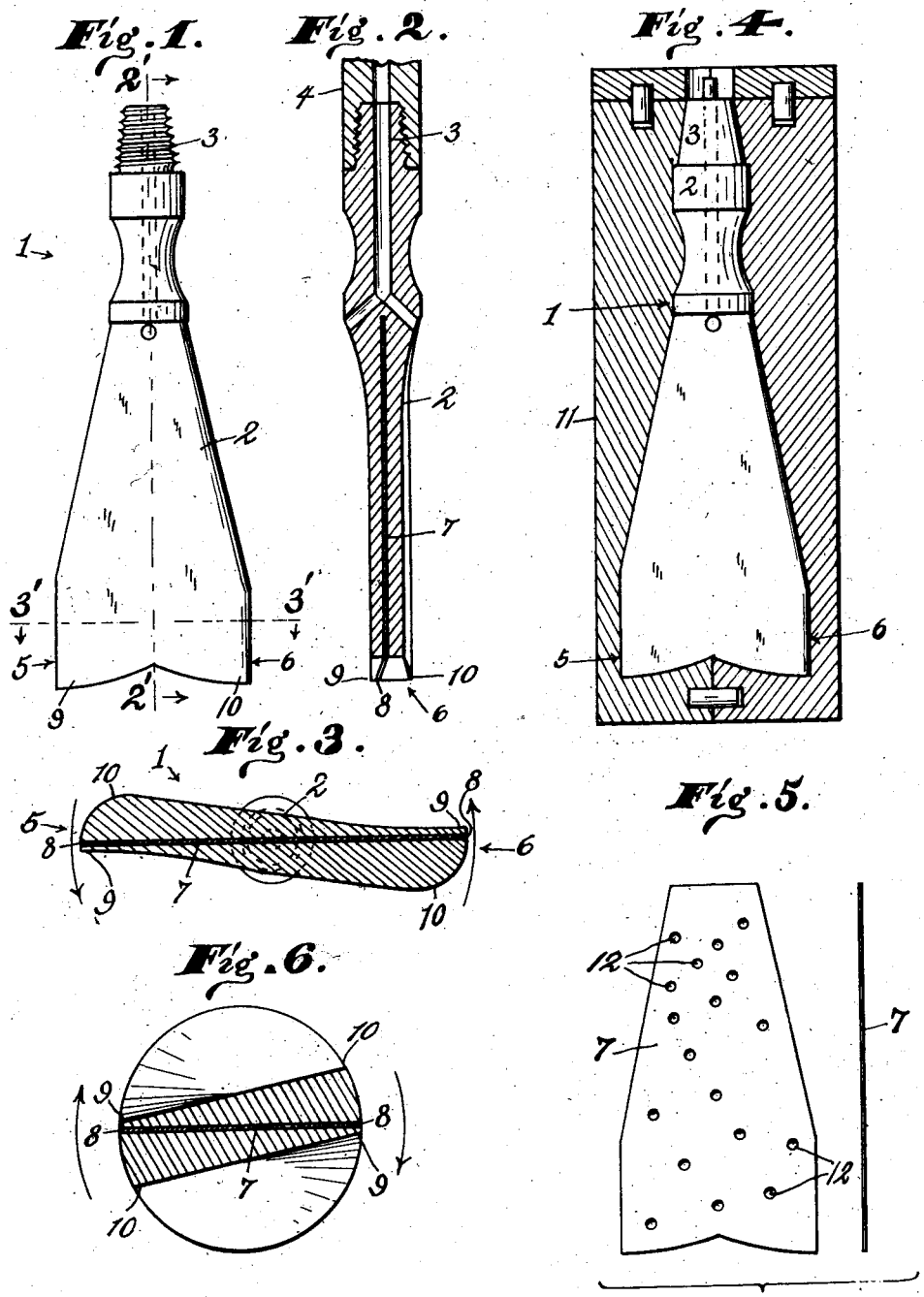
Inventors
William Edward Sterk,
Ernest G. Hansen by
Lockwood & Lockwood,
Their Attorneys.

Patented May 22, 1928.

1,671,052

UNITED STATES PATENT OFFICE.

WILLIAM EDWARD STERK AND ERNEST G. HANSEN, OF LOS ANGELES, CALIFORNIA; SAID ERNEST G. HANSEN ASSIGNOR TO CLAUDE B. DURST.

CUTTING TOOL FOR EARTH, ROCK, AND STONE.

Application filed July 6, 1925. Serial No. 41,755.

An object of this invention is to provide tools for cutting or drilling earth, rock and stone that are highly effective in cutting the material and which when in use are automatically sharpened so that it is never necessary to regrind them. That is we provide tools having cutters that are molded or otherwise embedded in softer metal that is easily worn when brought into working contact with earth, rock and stone so that when worn it exposes the cutters that are sufficiently hard to cut into the material. In other words cutting edges of the harder metal are gradually and automatically exposed and maintained as the softer metal is worn away.

Another object of the invention is to provide a rotary tool formed of relatively soft metal and having spaced teeth in which a thin hardened steel ribbon is embedded and arranged so that its cutting edges are nearer to the faces than the flanks of the teeth so that a major portion of the reinforcing soft metal is rearward of the ribbon, thereby leaving a minor portion of the soft metal in advance of the ribbon to be worn away to expose its cutting edges.

Another object of the invention is to provide a tool for deep well drilling that will save considerable time and labor in the respect that the tool will remain in place on the drill rod and be continued in action, if so desired, until it is entirely worn away, as it is automatically sharpened as previously stated. Heretofore it has been necessary to expand considerable time and labor to frequently and repeatedly remove the drill rods from deep wells to resharpen the bit; and it is well understood that it is a long, arduous task to remove two or three thousand feet of drill rod so that the drill bits now in use can be made accessible for resharpening with additional time and labor expended to replace them; and as stated an object of this invention is to save time and labor unnecessarily expended in removing and replacing drill rods and bits. In the respect of providing a drill bit for use until its cutting member is entirely worn away the invention is broadly new and basic.

Features of the invention are shown in the construction and combination and arrangement of parts whereby a tool for cutting earth, rock and stone is provided that is simple to construct, durable in use, and which can be made cheaply.

Other objects, advantages and features of invention may appear from the accompanying drawings, the subjoined detailed description and the appended claims.

The accompanying drawings illustrate the invention, in which:

Figure 1 is a side view of a fish tail bit constructed in accordance with this invention.

Fig. 2 is a longitudinal section on the line 2'—2' of Fig. 1 showing a detail construction of the bit and also showing it attached to a deep well drill rod.

Fig. 3 is an enlarged cross section on line 3'—3' of Fig. 1.

Fig. 4 is a central longitudinal section through a mold showing a fish tail bit after it has been cast.

Fig. 5 is a grouped side and edge view of a cutter ribbon used in forming the fish tail bit shown in Figs. 1, 2, and 3.

Fig. 6 is an enlarged cross section through a twist drill bit.

The fish tail bit 1 is provided with a body 2 that preferably is made of a cheap soft metal that will easily wear away when brought into frictional contact with earth, rock and stone; and this body is provided with a threaded stem 3 of usual construction so that the bit can be detachably secured to a drill rod 4 and operated to drill a hole in a deep well not shown but well understood in the art.

The body 2 is provided with oppositely arranged integral teeth 5, 6 through which a cutter ribbon 7 is extended and arranged so that the edges of the ribbon are flush with the edges of the teeth; also the ribbon is preferably arranged so that its exposed edges 8 are nearer to the faces 9 than the flanks 10 of the teeth. In other words the ribbon is arranged in the teeth 5, 6 so that there is a heavy reinforcing or a major portion of soft metal behind the ribbon to hold it up against the work of cutting the earth, rock and stone and a minor portion of the soft metal in advance of the ribbon to be worn away to expose the cutting edges of the ribbon.

It is understood that the ribbons 7 are hard enough to efficiently cut into the earth, rock and stone in which they are to be employed and also that the ribbon can be wide or narrow, short or long as best suited to be fitted into the tool in which they are to be employed; and also the thickness of the ribbon can be varied relative to light or heavy work in which they are engaged.

Preferably the ribbons 7 are first arranged in a mold 11 so that when it is filled with molten metal to form the body 2 the ribbons 7 will be molded or otherwise embedded therein. The ribbons 7 are perforated with staggered holes 12 through which the molten metal can flow and in which it solidifies to form bonds that are adapted to firmly secure the cutter ribbons in place and also unite the faces 9 to the flanks 10 of the teeth.

The tool may be constructed in the form of a twist stone drill as shown in Fig. 6.

In operation the tool is attached to a drill rod or similar appliance and rotated or driven into the earth, rock and stone in the usual way, and frictional engagement of the soft body of the tool with the material will wear it away so as to expose the cutting edges of the ribbons that are hard enough to cut the material.

It is understood that the hardened ribbon will be slowly worn away and as it does the body also will be correspondingly worn to expose just enough of the ribbon to efficiently cut away the material; and the tool can thus be driven until the ribbon is entirely worn away.

In other words the tool is automatically sharpened by use so that it is not necessary to remove it from a deep well for resharpening.

We claim:

1. A tool for cutting earth, rock and stone, including a soft metal body centrally rotatable, and a hard metal cutter imbedded therein and arranged diagonally thereof so as to present cutting edges at opposite sides of the cutter, substantially as set forth.

2. A tool for cutting earth, rock and stone, including a metal body adapted to be detachably secured to a drill rod, extensions integral with said body, a thin hardened steel ribbon imbedded in said extensions and arranged diagonally so that its cutting edges are nearer to the face than the flanks of said extensions, whereby the cutting edges of the ribbon will be heavily reinforced and adapted to be constantly exposed as the tool is used.

In witness whereof, we have hereunto affixed our signatures.

WILLIAM EDWARD STERK.
ERNEST G. HANSEN.